United States Patent [19]

Tomita

[11] 3,953,356

[45] Apr. 27, 1976

[54] METHOD OF PRODUCING GASEOUS MIXTURE RICH IN HYDROGEN

[75] Inventor: Tadayoshi Tomita, Kanagawa, Japan

[73] Assignee: Toyo Engineering Corporation, Tokyo, Japan

[22] Filed: Apr. 22, 1974

[21] Appl. No.: 462,929

Related U.S. Application Data

[63] Continuation of Ser. No. 244,549, April 17, 1972, abandoned.

[30] Foreign Application Priority Data

Apr. 19, 1971  Japan.............................24480/71

[52] U.S. Cl................................ 252/373; 252/463
[51] Int. Cl.² ......................... C01B 2/02; C01B 2/16
[58] Field of Search ..................................... 252/373

[56] References Cited

UNITED STATES PATENTS

| 2,682,459 | 6/1954 | Stanler | 48/214 |
| 2,992,906 | 7/1961 | Guptill | 252/373 X |
| 3,048,476 | 8/1962 | Dwyer | 252/373 X |

OTHER PUBLICATIONS

Michel, Gas Und Wasserfach, 95, pp. 598–603, 1954.

*Primary Examiner*—Howard T. Mars
*Attorney, Agent, or Firm*—Woodhams, Blanchard and Flynn

[57] ABSTRACT

A gaseous mixture rich in hydrogen is prepared by catalytic partial oxidation of hydrocarbons at a temperature of higher than 850°C in the presence of a catalyst containing 10 to 60% by weight of calcium oxide and 40 to 90% by weight of aluminum oxide.

2 Claims, 1 Drawing Figure

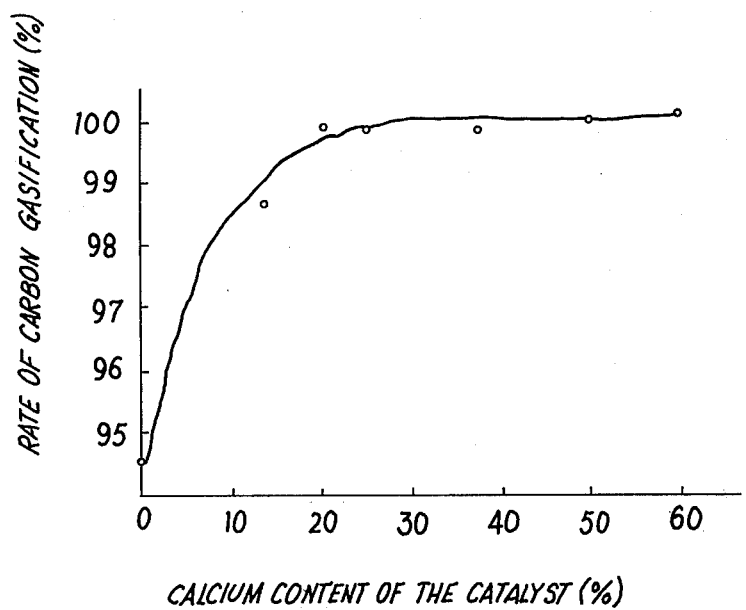

METHOD OF PRODUCING GASEOUS MIXTURE RICH IN HYDROGEN

This is a continuation, of application Ser. No. 244,549, filed Apr. 17, 1972 and now abandoned.

CROSS-REFERENCE TO RELATED APPLICATION

This application is related to U.S. application Ser. No. 178,264, filed Sept. 7, 1971 now abandoned.

BACKGROUND OF THE INVENTION

1. Field of the Invention

This invention relates to a method for converting various kinds of hydrocarbons, including heavy hydrocarbons, as well as light hydrocarbons, into a gaseous mixture rich with hydrogen by a catalytic partial oxidation process.

2. Description of the Prior Art

Heretofore, internal heating-type thermal or catalytic cracking processes, external heating-type catalytic cracking processes, and other similar processes have been employed industrially for producing hydrogen-rich gaseous mixtures from hydrocarbons.

In general, the known partial oxidation processes include two types, namely, (1) the non-catalytic process (thermal cracking process) in which no catalyst is used and (2) the catalytic process (catalytic cracking process) in which a catalyst is used. The present invention belongs to the latter type.

In the case of the non-catalytic partial oxidation process, either light or heavy hydrocarbons can be used as the starting material for the reaction, but according to this process, the hydrocarbons are thermally cracked at a high temperature of over 1,300°C. using a large amount of oxygen, so that means for producing oxygen and a power source for operating such means are essential.

On the other hand, in the case of the catalytic partial oxidation process, usually only the light fractions from such substances as natural gas, ethane, propane, butane, straight-run naphtha or the like can be used as the starting material hydrocarbons. Use of heavy hydrocarbons such as kerosene, gas oil, crude oil, etc., has been considered unfeasible because carbon precipitation inevitably occurs during the reaction using such heavy hydrocarbons. Further, since a nickel catalyst is used as the reaction catalyst, the sulfur content of the hydrocarbons used as the starting material must be strictly limited to a level below that which would cause catalyst poisoning during the reaction. Hence, a high-grade preliminary desulfurization treatment of the starting material is essential.

In performing catalytic partial oxidation of heavy oils such as crude oil, there has been employed a regeneration-type gas producing method in which there are repeated in sequence (1) the step of burning the carbon precipitated on the catalyst with air so as to remove the precipitated carbon and also raising the temperature of the packed bed, and (2) the step of producing the hydrogen-rich gas. This method, however, involves unavoidable heavy losses and also involves difficulties in performing the operations under an elevated pressure.

SUMMARY OF THE INVENTION

This invention provides an improved method for catalytic partial oxidation of various kinds of hydrocarbons. I, together with other inventors, have previously proposed in Serial No. 178264 a method for steam reforming of various kinds of hydrocarbons by using a calcium oxide and aluminum oxide composite as a catalyst, according to which method a continuous steam reforming reaction can be practiced without causing carbon precipitation or any trace of catalyst poisoning by sulfur. The method of the present invention, which is free of the above-mentioned disadvantages of the prior art, is a result of my further discoveries on the process of the above-mentioned previous invention.

More specifically, the present invention provides a process for preparing a gaseous mixture rich with hydrogen by catalytic partial oxidation of various kinds of hydrocarbons, in which the reaction is carried out at a temperature of higher than 850°C., in the presence of a catalyst consisting essentially of 10 to 60% by weight of calcium oxide and 40 to 90% by weight, of aluminum oxide.

A sintered composition of calcium oxide and aluminum oxide is an effective catalyst in the catalytic thermal cracking of heavy hydrocarbons, as well as light hydrocarbons, and it also is useful as an inhibitor against carbon precipitation. Usually, heavy oils contain a large amount of sulfur, but no sulfur compounds become present on the catalyst of this invention and, during prolonged use, the catalyst undergoes little reduction of its catalyst activity.

In the process of the present invention, a reaction temperature above 850°C. is suitable. In case starting materials having a high heavy hydrocarbon content are used, a relatively high temperature within said range is preferably employed and, on the other hand, in case of using starting material of high light hydrocarbon content, a relatively low temperature within said range is preferably employed.

The space velocity of flow of the reactants in the process of this invention is within the range of 500 – 4,000/Hr. The steam-carbon molar ratio can be from 0.5 to 10.

The reaction can be carried out under atmospheric pressure or above. The operating pressure is not critical and can be any pressure between atmospheric and 300 atm.

In the reaction of the present invention, reactors containing at least one fixed catalyst bed, or fluidized beds or spouted beds can be used.

The heat of reaction can be supplied by means of either an external heating system in which the reactor is heated externally through a heat exchange wall; or the so-called internal heating system in which an appropriate quantity of oxygen, oxygen rich air, or air is supplied to the reactor, and the heat generated by partial oxidation of the raw materials is utilized.

No particular influence on the reaction is exerted by impurities such as sulfur contained in the starting materials supplied. Therefore, no limitation of the composition of starting materials within those ranges normally occurring in the conventional petroleum oil materials is necessary.

The invention includes gasification of heavy oils such as crude oils as well as naphtha, kerosene or light oil fractions derived from these crudes, and mixtures of light oils and crudes. The light oils are those containing from 6 to 8 carbon atoms such as heptanes, octanes, and the like.

If feedstock oils such as crude oils containing residual oils are used, the reaction should be carried out at a temperature above 900°C. in order to prevent carbon deposition. In general, sintered mixtures of aluminum oxide and calcium oxide, which may be eutectic crystals, spinel structures or mixtures thereof, are stable enough and durable for a long period of time at such a high temperature.

Various compositions of calcium oxide and aluminum oxide were experimentally prepared and were subjected to tests by X-ray analysis. As a result it was found that the critical maximum content of calcium oxide in the catalyst is 60% by weight, in order to provide sufficient mechanical strength so that it will function effectively as a catalyst. If the calcium oxide content exceeds 60% by weight, free calcium oxide is formed and creates a tendency toward powdering of the sintered catalyst composition.

The drawing is a graph showing the change of the rate of carbon gasification with the change of the calcium content of the catalyst.

The drawing shows the results of gasification experiments conducted by using light fractions from Kuwait crude oil as the starting material.

The properties of the starting oil, operating conditions and catalyst composition, as used in the experiments, are as follows:

| 1 | Feed oil properties: | | | |
|---|---|---|---|---|
| | Distillation end point | | | 360°C. |
| | Specific gravity | | | 0.7835 |
| 2. | Operating conditions: | | | |
| | Temperature | | | 1,000°C. |
| | Pressure | | | atmospheric |
| | $H_2O/C$ (mol ratio) | | | 4 |
| 3. | Catalyst composition (% by weight) | | | |
| | | $Al_2O_3$ | CaO | Other inorganic substances |
| | 1. | 99.0 | 0 | 1.0 |
| | 2. | 85.0 | 13.3 | 1.7 |
| | 3. | 78.1 | 20.0 | 1.9 |
| | 4. | 72.9 | 25.0 | 2.1 |
| | 5. | 60.4 | 37.1 | 2.5 |
| | 6. | 47.3 | 50.0 | 2.7 |
| | 7. | 7.4 | 59.9 | 2.7 |

In this case, the rate of carbon gasification is determined from the following formula:

Rate of carbon gasification (%)-

$$\frac{\text{amount of carbon in produced gas}}{\text{amount of carbon in supplied hydrocarbon}} \times 100$$

The results of the experiments show that, as will be noticed from the drawing, it is an essential condition for inhibiting carbon precipitation that the calcium oxide content of the catalyst be more than 10% by weight, preferably more than 20% by weight.

Further studies on sulfur resistivity led us to the discovery that sulfur poisoning can be prevented from affecting the catalyst as further explained below. That is, as described in the examples set forth hereinafter, it was found that it is possible to carry out the catalytic partial oxidation without incurring any significant decrease of the catalyst activity even when using a feed oil containing sulfur in an amount of 1 to 3% by weight. In other words, it was found that the sulfur compounds of aluminum and calcium ($Al_2S_3$ and CaS) are unstable under high temperature, particularly in the presence of steam, so that the sulfur in the feed oil is converted to hydrogen sulfide, but no $Al_2S_3$ and CaS are formed.

The X-ray fluorescence analysis of the catalysts used in the examples revealed substantially no trace of sulfur.

Thus, as compared with the conventional catalytic partial oxidation processes in which only light hydrocarbons can be used as the feed material, the process according to the present invention is advantageous in that, because no poisoning is caused by sulfur compounds present in the feed hydrocarbon material, it is possible to use as the feed material not only light hydrocarbons but also heavy hydrocarbons containing a large amount of sulfur, and that the catalyst life is markedly prolonged because substantially no carbon precipitation occurs. Also, the method of the present invention has the following advantages over the conventional non-catalytic partial oxidation processes: the reaction operation can be carried out at a lower temperature; the amount of oxygen used in the reaction can be reduced; the effective gas concentration in the produced gas is increased; and the yield of gas generated per unit capacity of reactor is increased owing to increased reaction velocity resulting from the enhanced catalytic activity.

The amounts of feed oil, steam and oxygen required for producing each 1,000 $Nm^3$ of effective product gas, which is defined as the sum of $H_2 + CO$ in the product gas, according to (1) the process of the present invention and (2) a conventional non-catalytic partial oxidation process, using the same reactor and using the same Kuwait crude oil as the feed material in both processes, were compared. The results were as follows:

| | Conventional non-catalytic partial oxidation process | Process of the present invention |
|---|---|---|
| Feed oil (kg) | 333 | 310 |
| Steam (kg) | 167 | 155 |
| Oxygen ($Nm^3$) | 264 | 211 |

The results shown in the above table demonstrate the marked superiority of the process of the present invention as compared to the conventional non-catalytic partial oxidation process in terms of the feed materials required.

Further, the use of the catalyst of the present invention, which does not cause carbon precipitation or poisoning by sulfur in the feed oil, makes possible a reduced frequency of exchange of the burner tips for the material feeding devices because the reaction can be carried out as a comparatively low temperature. Also, the fact that substantially no carbon precipitation occurs during the reaction is conductive to prolonged service life of the refractory material and other parts of the reactor which would otherwise be damaged by deposition of precipitated carbon as is often experienced in the conventional processes. The greatest advantage of this invention is that it can employ readily available heavy oils as the hydrocarbon feed material for the reaction, which has not been possible with any of the conventional catalytic partial oxidation processes.

Now, the invention will be described in further detail by the following illustrative examples according to the present invention. In each of the examples set forth hereinbelow, there was used an thermally insulated reactor measuring 1.5 m in outer diameter, 0.8 m in inner diameter and 2 m in height and lined with electrocast alumina.

Each of the catalysts used in the process of the present invention may optionally contain up to 50 percent by weight of one or more of alkaline earth metal oxides such as strontium oxide, beryllium oxide or magnesium oxide, but the amount of other contaminant inorganic substances is (1) less than 1 wt.% in the case of the contaminant $SiO_2$ and (2) a total amount of oxides of metals of higher than Group V of the Periodic Table is less than 3%.

EXAMPLE 1

Catalytic partial oxidation was carried out by using Kuwait crude oil as the feed oil. The composition and configuration of the catalyst used, properties of the feed oil, composition of generated gas and other particulars of the reaction were as follows:

1. Catalyst composition (% by weight):
   $Al_2O_3$: 47.3   CaO: 50.0
   Other inorganic substances: 2.7
2. Catalyst configuration:
   Raschig ring type with 15 mm outer diameter, 15 mm height and 5 mm inner diameter. Compressive strength: 400 kg/cm² in the direction of the cylinder axis.
3. Properties of feed oil (Kuwait crude oil):
   Specific gravity: 0.8532
   Elementary analysis (% by weight): C: 85.08, H: 12.50, S: 2.93
4. Reaction conditions:
   Temperature    1,000°C.
   Pressure       20 kg/cm²
   Feed oil       10,000 kg/hr.
   Steam          5,000 kg/hr.
   Oxygen (95%)   6,790 Nm³/hr.
5. Generated gas composition (% by volume):
   CO: 42.59,  $CO_2$: 5.04,  $H_2$: 50.37,
   $N_2$: 0.94,  $CH_4$: 0.23,  $H_2S$: 0.84
6. Amounts of reaction materials consumed per 1,000 Nm³ of effective product gas ($H_2$ + CO) produced:
   Feed oil    310.3 kg/1,000 Nm³
   Steam       155.2 kg/1,000 Nm³
   Oxygen      301.0 Nm³/1,000 Nm³

No carbon precipitation was observed on the catalyst. Also, no change was detected on the catalyst surface even when feed oil containing as much as 2.93% by weight of sulfur was used. The compressive strength of the catalyst after 500 hours consecutive use was 300 kg/cm².

EXAMPLE 2

Gasification was carried out by a catalytic partial oxidation reaction using naphtha fractionated from Kuwait crude oil as the feed oil and the same type of catalyst as used in Example 1. The properties of the feed oil, generated gas composition and other details were as follows:

1. Properties of the feed oil (fractionated from Kuwait crude oil):
   Distillation end point        180°C.
   Specific gravity              0.7413
   Elementary analysis
   (% by weight)                 C: 85.24, H: 14.74, S: trace
   Volumetric yield based on
   crude oil:                    24.2%
2. Reaction conditions
   Temperature    900°C.
   Pressure       20 kg/cm²
   Feed oil       10,000 kg/hr.
   Steam          5,000 kg/hr.
   Oxygen (95%)   6,430 Nm³/hr.
3. Generated gas composition (% by volume):
   CO: 40.82,  $CO_2$: 6.12,  $H_2$: 51.84,
   $N_2$: 0.89,  $CH_4$: 0.33
   There was observed no carbon precipitation on the catalyst.

EXAMPLE 3

A partial oxidation was carried out by using the same type of catalyst and the same feed oil as used in Example 1 and mixing air at a suitable rate to obtain a desired gas composition for use as an ammonia synthesis gas. The reaction conditions, generated gas composition and other details were as follows:

1. Reaction conditions:
   Temperature    1,000°C.
   Pressure       20 kg/cm²
   Feed oil       10,000 kg/hr.
   Steam          5,000 kg/hr.
   Oxygen (95%)   5,000 Nm³/hr.
   Air            13,000 Nm³/hr.

2. Generated gas composition (% by volume)
   $H_2$: 38.1,  CO: 32.2,  $CO_2$: 5.4,
   $CH_4$: 0.2,  $H_2S$: 0.7,  $N_2$: 23.5
3. Amounts of reaction materials consumed per 1,000 Nm³ effective gas ($H_2$ + CO) production:
   Feed oil    311.3 kg/1,000 Nm³
   Steam       162.0 kg/1,000 Nm³
   Oxygen      236.1 Nm³/1,000 Nm³
   Air         417.0 Nm³/1,000 Nm³

No carbon precipitation was observed on the catalyst and no change took place on the catalyst surface even when a feed oil containing as much as 2.93% by weight of sulfur was used.

The embodiments of the invention in which an exclusive property or privilege is claimed are defined as follows:

1. In a process for producing gaseous mixtures rich in hydrogen from a feedstock of normally liquid hydrocarbons, in which said feedstock is catalytically partially oxidized by an oxidizer selected from the group consisting of oxygen, oxygenrich air and air in the presence of steam wherein the molar ratio of steam to carbon in said feedstock is 0.5 to 10.0 at a temperature of from higher than 850° to 1000°C, at a pressure in the range of one to 300 atmospheres, at a space velocity of from 500 to 4000/hr, in the presence of a catalyst, the improvement wherein said catalyst is a sintered catalyst consisting of:

from more than 20 percent by weight to 60 percent by weight of calcium oxide,
less than 1.0 percent by weight of silicon dioxide,
less than 3.0 percent by weight of other inorganic contaminants of oxides of metals higher than Group V of the Periodic Table, and the balance is aluminum oxide.

2. A process as claimed in claim 1 in which said catalyst is a sintered mixture in the form of eutectic crystals, spinel structures, or mixtures thereof.

* * * * *